(12) United States Patent
Granholt

(10) Patent No.: US 10,274,640 B2
(45) Date of Patent: Apr. 30, 2019

(54) METHOD AND DEVICE FOR ATTENUATING VIBRATIONS IN MARINE SEISMIC ACQUISITION EQUIPMENT

(71) Applicant: CGG SERVICES SAS, Massy (FR)

(72) Inventor: Jason Daniel David Andersen Granholt, Lierstranda (NO)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 15/521,656

(22) PCT Filed: Nov. 19, 2015

(86) PCT No.: PCT/IB2015/002368
§ 371 (c)(1),
(2) Date: Apr. 25, 2017

(87) PCT Pub. No.: WO2016/079592
PCT Pub. Date: May 26, 2016

(65) Prior Publication Data
US 2017/0242154 A1    Aug. 24, 2017

Related U.S. Application Data

(60) Provisional application No. 62/133,484, filed on Mar. 16, 2015, provisional application No. 62/082,714, filed on Nov. 21, 2014.

(51) Int. Cl.
*G01V 1/38* (2006.01)
*G01V 13/00* (2006.01)
*B63B 21/66* (2006.01)

(52) U.S. Cl.
CPC .............. *G01V 13/00* (2013.01); *B63B 21/66* (2013.01); *G01V 1/38* (2013.01); *G01V 1/3808* (2013.01); *B63B 2211/02* (2013.01)

(58) Field of Classification Search
CPC ........ G01V 13/00; G01V 1/3808; G01V 1/38; B63B 21/66; B63B 2211/02
(Continued)

(56) References Cited

U.S. PATENT DOCUMENTS 3,860,899 A    1/1975  Watlington
4,762,208 A    8/1988  Reynier et al.
(Continued)

OTHER PUBLICATIONS

Sun et al., "Parametrically excited oscillation of stay cable and its control in cable-stayed bridges," Journal of Zhejiang University Science V .4 , No. 1, pp. 13-20, Jan.-Feb. 2003. (Year: 2003).*
(Continued)

*Primary Examiner* — Daniel L Murphy
(74) *Attorney, Agent, or Firm* — Patent Portfolio Builders PLLC

(57) ABSTRACT

Systems and methods for attenuating vibrations in marine seismic equipment involve a vessel towing a seismic streamer having a plurality of seismic receivers. The seismic streamer is connected to the vessel by a front-end and a damper is coupled to the front-end. A vibration on the front-end is detected and a damper response to the detected vibration on the front-end is then determined. The damper is actively adjusted based on the damper response. The active adjustment dampens vibrations in an axial direction along a lead-in of the front-end and/or vibrations in a direction transverse to an axial direction of the lead-in.

17 Claims, 9 Drawing Sheets

(58) Field of Classification Search
USPC .......................................................... 367/24
See application file for complete search history.

(56) References Cited

U.S. PATENT DOCUMENTS

| | | | |
|---|---|---|---|
| 5,523,983 A | 6/1996 | Morningstar et al. | |
| 5,526,906 A | 6/1996 | Vandiver et al. | |
| 6,953,108 B2 | 10/2005 | Anderfaas et al. | |
| 9,841,519 B2 * | 12/2017 | Rouquette | G01V 1/364 |
| 2007/0068756 A1 * | 3/2007 | Huston | F16F 7/1005 |
| | | | 188/378 |

OTHER PUBLICATIONS

"Standing wave," Britannica.com, 2018, downloaded Oct. 7, 2018, 1 page. (Year: 2018).*
International Search Report, and Written Opinion, dated Mar. 7, 2016, from corresponding PCT Application No. PCT/IB2015/002368.
J.M. Ko et al., "Field vibration tests of bridge stay cables incorporated with magneto-rheological (MR) dampers", Smart Structures and Materials 2002: Smart Systems for Bridges, Structures, and Highways, Proceedings of SPIE, Jan. 1, 2002, pp. 30-40, vol. 4696.
Bogdan Sapinski, "Magnetorheological Dampers in Vibration Control of Mechanical Structures", Mechanics, 2009, pp. 18-25, vol. 28, No. 1.

* cited by examiner

METHOD AND DEVICE FOR ATTENUATING VIBRATIONS IN MARINE SEISMIC ACQUISITION EQUIPMENT

CROSS REFERENCE TO RELATED APPLICATIONS

The present application is a National Stage of PCT Application No. PCT/IB2015/002368, filed Nov. 19, 2015, which claims priority and benefit from U.S. Provisional Patent Application No. 62/082,714, filed on Nov. 21, 2014, for "Adaptive Vibration Cancellation in Marine Seismic Acquisition" and U.S. Provisional Patent Application No. 62/133,484, filed on Mar. 16, 2015, for "Adaptive Vibration Cancellation in Marine Seismic Acquisition," the entire content of these provisional patent applications is incorporated in their entirety herein by reference.

BACKGROUND

Technical Field

Embodiments of the subject matter disclosed herein generally relate to attenuating vibrations in marine seismic acquisition equipment. More specifically, the embodiments relate to noise cancellation by actively attenuating axial and/or transverse vibrations in marine seismic acquisition equipment.

Discussion of the Background

Seismic data acquisition and processing generate a profile (image) of geophysical structures under seafloor or subsoil by emitting waves towards the seafloor and receiving and processing the reflections. FIG. 1 is a schematic diagram of a seismic survey system 100 used for seismic data acquisition. The system includes a survey vessel 102, which tows a source array 118 with source elements that generate waves directed at the surveyed area and a plurality of streamers 104, each of the streamers having one or more receivers 106 for receiving reflections from the surveyed area. The source elements can be vibrators, sparkers, explosives, or an electromagnetic source. The receivers 106 can be hydrophones, geophones, accelerometers, or electromagnetic sensors.

The streamers 104 are coupled to the survey vessel 102 by front-end gear, which includes a plurality of lead-in cables 108. Spread ropes 110 laterally couple adjacent lead-in cables 108 to each other and are designed to prevent the distance between adjacent streamers from exceeding a desired distance. The lead-in cables 108 extend beyond the spread rope 110 and include a float 112, coupled to a bend restrictor 114, to lift the streamers 104 to an intended depth. Wide-tow ropes 120 are connected to spurline 122 outside of the lead-ins 108. Unlike lead-ins 108, wide-tow ropes 120 do not carry an electrical connection. Wings 116 are connected to the spurline 122 via a lever-arm (not illustrated) to achieve parallel trajectories for the streamers 104 in the towing direction and also to achieve a desired separation between the center-most lead-in cables.

FIG. 2 is a side view of a streamer when deployed under water. Buoys 112, 142 maintain the streamers 104 substantially parallel relative to a reference plane (e.g., the water surface). Specifically, a head-buoy 112 is connected to a head portion 104A of the streamer 104 and a tail-float 142 is connected at a tail portion 104B of the streamer 104. The head-buoy and tail-float provide flotation to the streamer even if the streamer is buoyant neutral. The head-buoy and tail-float are configured to float at the water surface 150 and corresponding cable 140 (for mechanical purposes) connects the head-buoy 112 to the streamer 104 to maintain the streamer at the desired depth H.

The head-buoy 112 is equipped with various equipment, e.g., acoustic equipment for detecting positions of neighboring streamers and global positioning system (GPS) equipment for determining an absolute position of the streamer. In order to power the equipment, electric power generated on the towing vessel may be transferred through an electric cable 152 to the head-buoy 112. The electric cable 152 and the cable 140 connect to the streamer 104 through a connection device 154.

As the streamers are towed through the water the front-end typically generates vibrations that are transferred to the streamers. The vibrations can be generated both axially, i.e., along the length of the streamer, and transversely, i.e., in the direction between the streamer and the water surface. These vibrations generate radial noise, which impacts the signals received by the streamers.

One conventional solution to address vibrations generated by the front-end is to incorporate elastic sections, commonly referred to as Vibration Isolation Modules (VIMs), between the lead-in cables and the streamers. For example, in FIGS. 1 and 2 VIMs 124 are arranged between the lead-ins 108 and streamers 104. These elastic sections, however, have a constant elasticity and can be optimized to dampen only a limited range of frequencies. Further, these elastic sections generally only dampen axial vibrations and have little dampening effect in the transverse direction.

Accordingly, it would be desirable to provide devices, systems and methods to attenuate vibrations generated by the front-end while avoiding the afore-described problems and drawbacks.

SUMMARY

According to one embodiment, there is a method for reducing vibrations on a front-end of seismic survey equipment, which involves a vessel towing a seismic streamer comprising a plurality of seismic receivers. The seismic streamer is connected to the vessel by the front-end and a damper coupled to the front-end. A vibration on the front-end is detected and a damper response to the detected vibration on the front-end is then determined. The damper is actively adjusted based on the damper response.

According to another embodiment there is a system, which involves a seismic streamer comprising a plurality of seismic receivers and a front-end connected to the seismic streamer on a first side and having a vessel coupling on a second side. A vibration sensor is coupled to the front-end and a processor coupled to the vibration sensor. An active damper is coupled to the front-end and the processor. The active damper is arranged to dampen vibrations of the front-end. The processor controls the active damper to dampen the vibrations of the front-end using information from the vibration sensor.

According to yet another embodiment there is a non-transitory computer-readable medium containing computer-executable code that when read by a computer causes the computer to perform a method for reducing vibrations on a front-end of seismic survey equipment. The method involves detecting a vibration on the front-end while a vessel tows a seismic streamer comprising a plurality of seismic receivers. The seismic streamer is connected to the vessel by the front-end and a damper is coupled to the front-end. A damper response to the detected vibration on the front-end is determined and the damper is actively adjusted based on the damper response.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed with regard to the terminology and structure of marine seismic equipment. However, the embodiments to be discussed next are not limited to marine seismic equipment, but may be applied to other types of seismic equipment subject to vibrations.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 3:
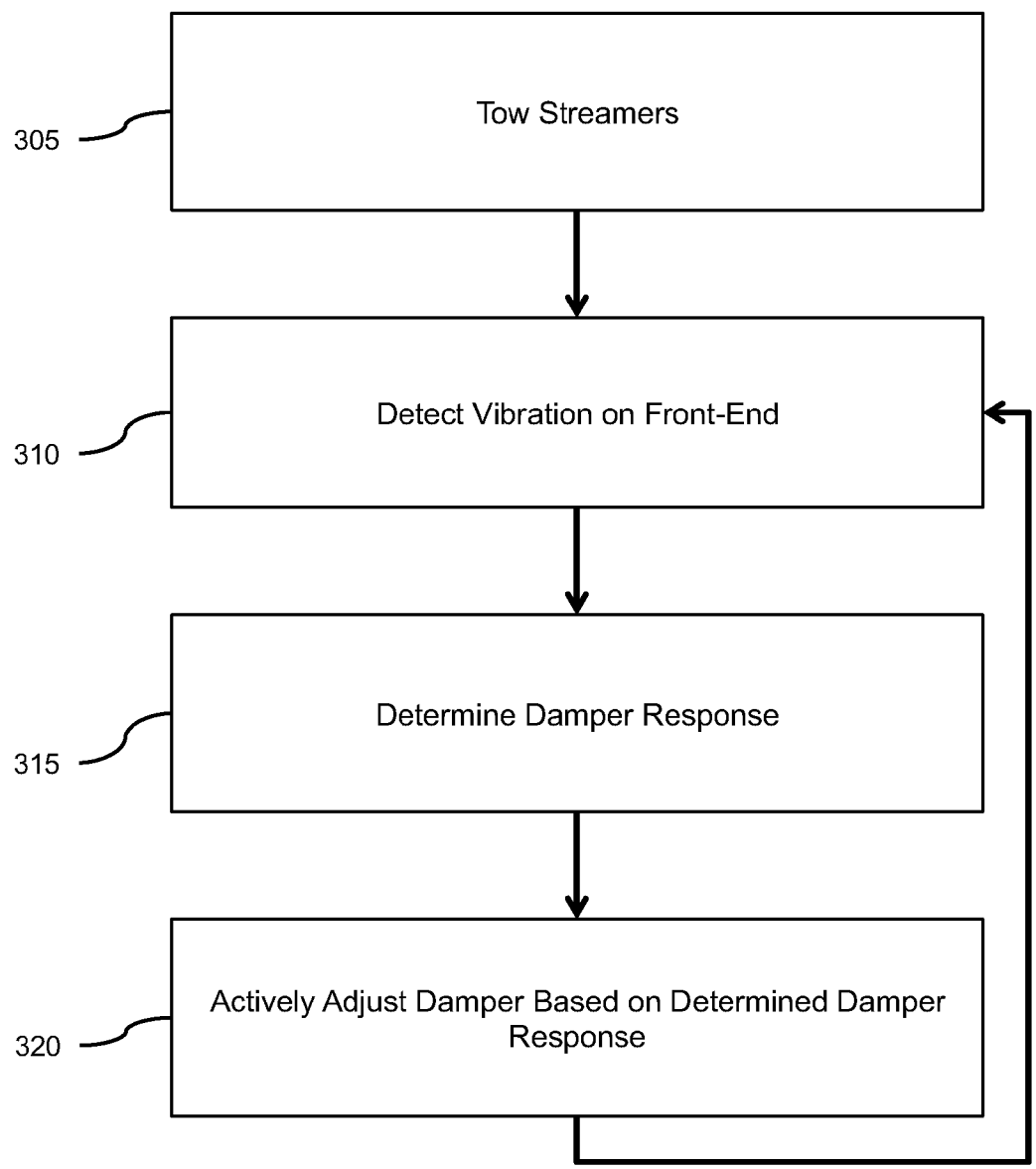
FIG. 3 is a flowchart of a method for actively attenuating vibrations in marine seismic acquisition equipment.

In an embodiment a vibration detector and an active damper are arranged on the front-end between the vessel and the streamers and the active damper is adjusted based on the detected vibrations. Referring now to FIG. 3, in an embodiment while a vessel tows the front-end and streamers (step 305) a vibration detector detects vibrations on the front-end (step 310). Based on the detected vibrations a damper response is determined (step 315), which is used to actively adjust the damper (step 320). Because the damper response is intended to attenuate the vibrations the damper response will have approximately the same frequency and amplitude as the detected vibrations with the damper response being performed so that the minima of the damper response aligns with the maxima of the detected vibrations. As indicated by the return path from step 320 to step 310, the active adjustment is an ongoing process performed during a seismic survey because vibrations will be continuously induced by the front-end during the towing of the streamers. Thus, if the frequency and/or amplitude of the vibrations changes, the active damper will be adjusted accordingly. Although the steps of FIG. 3 are arranged in a particular order, not all of the steps need to be performed in this order. The towing of the streamers will be performed while the remaining steps are performed.

Figure 4A:
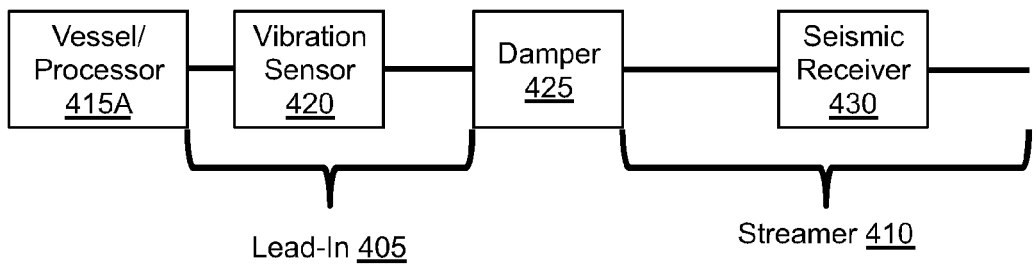
FIGS. 4A-4C are schematic diagrams of systems for attenuating axial vibrations.
Figure 4B:
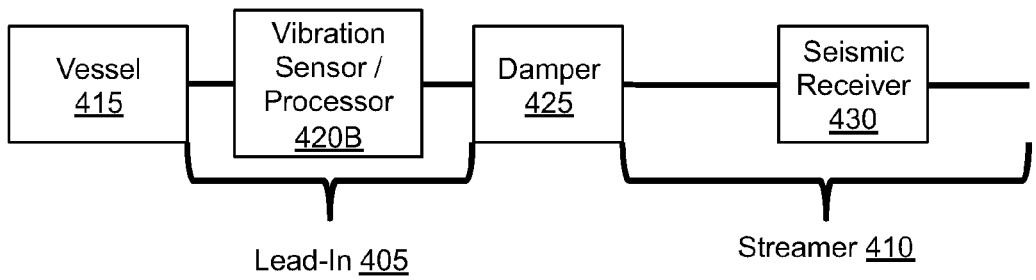
Figure 4C:
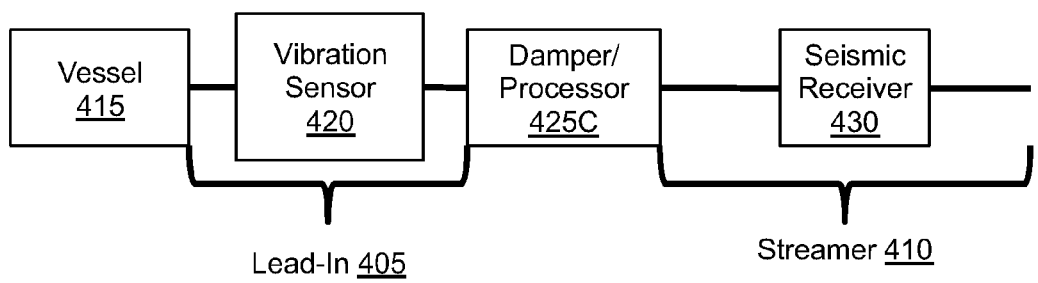

FIGS. 4A-4C are schematic diagrams of systems for attenuating axial vibrations. The systems include a front-end having a lead-in 405 with a coupling connecting it to a vessel 415. A vibration sensor 420 is also coupled to the lead-in 405 of the front-end. The vibration sensor 420 can be an accelerometer (e.g., a piezoelectric piezo resistive, or piezo capacitive accelerometer), a velocity meter, and/or the like. A damper 425 is coupled between the lead-in 405 and the seismic streamer 410. The seismic streamer 410 includes one or more seismic receivers 430. The systems also include a processor for processing the signals from the vibration sensor 420 and providing control signals to damper 425. Based on these control signals the damper 425 attenuates the vibrations by adjusting its overall length, i.e., lengthening or contracting, at approximately the same frequency and amplitude as the vibrations but in an opposite phase.

The processor receiving the signals from the vibration sensor and sending the control signals to the active damper can be arranged in a variety of different locations. In the embodiment of FIG. 4A the processor is located in or on the vessel 415A, in the embodiment of FIG. 4B the processor is located in or on the vibration sensor 420B, and in the embodiment of FIG. 4C the processor is located in or on the damper 425C. Accordingly, in these different embodiments there will be a signaling connection from the vibration sensor to the processor and a control connection from the processor to the damper. The signaling and control connections can be separate wires, a bus, and/or a wireless connection.

FIGS. 5A-5D are schematic diagrams of systems for attenuating transverse vibrations. These systems are similar to those of FIGS. 4A-4C with the addition of a float 530 coupled to the damper 525. Float 530 is commonly referred to as a head-float or head-buoy, and thus includes the various equipment described above, such as acoustic equipment and GPS equipment. The systems in FIGS. 5A-5D include a front-end having a lead-in 505 connected to a vessel 515. A vibration sensor 520 is coupled to the lead-in 505. A damper 525 is coupled between the lead-in 505 and the seismic streamer 510. The seismic streamer 510 includes one or more seismic receivers 530. The damper 525 couples the front-end 505 to the float 530. The systems also include a processor for processing the signals from the vibration sensor 520 and providing control signals to damper 525. Based on these control signals the damper 525 adjusts its length, and accordingly the distance between the lead-in 505 and the float 530, at approximately the same frequency and amplitude as the vibrations but in an opposite phase.

Figure 5A:
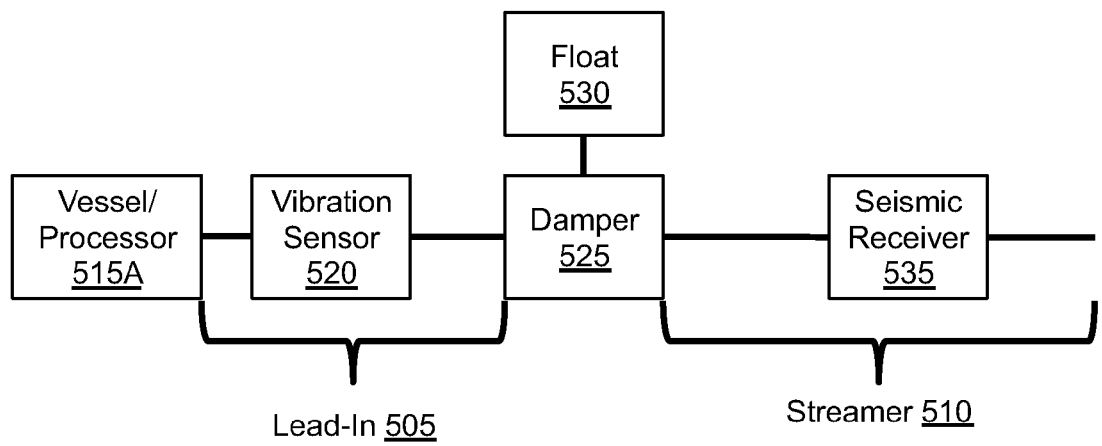
FIGS. 5A-5D are schematic diagrams of systems for attenuating transverse vibrations.
Figure 5B:
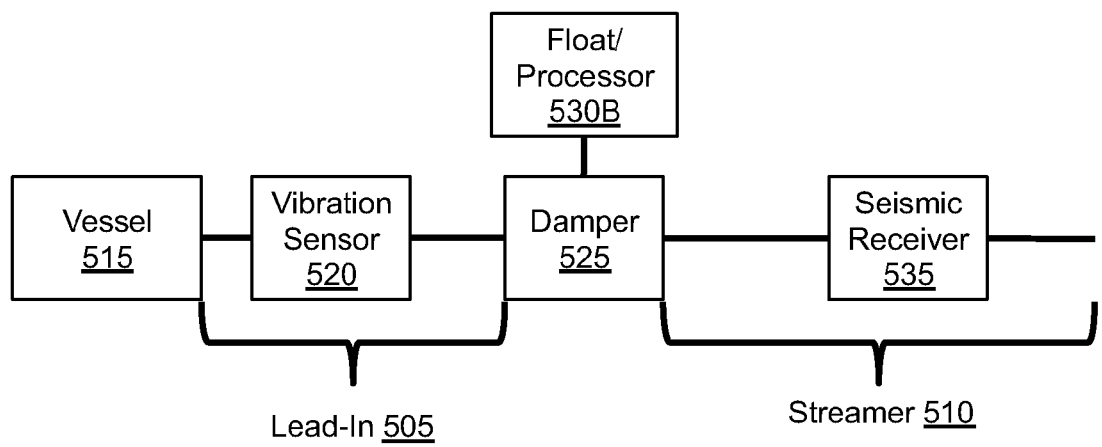
Figure 5C:
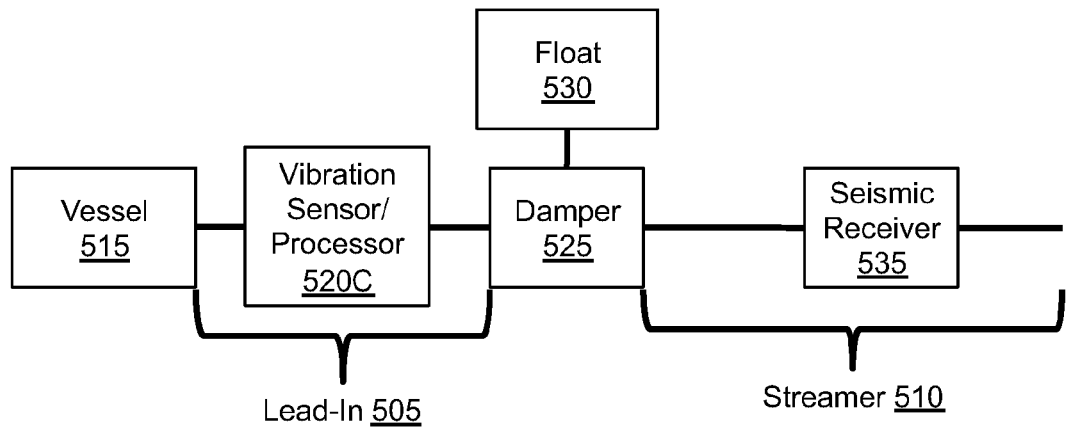
Figure 5D:
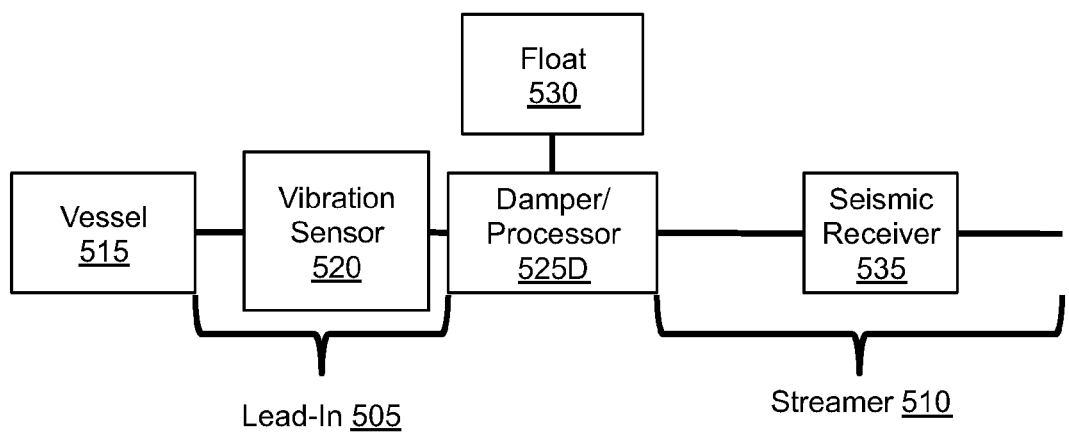

Similar to the embodiments of FIGS. 4A-4C, the processor in the embodiments of FIG. 5A-5D can be arranged in a variety of locations. In the embodiment of FIG. 5A the processor is arranged in or on the vessel 515A, in the embodiment of FIG. 5B the processor is located in or on the float 530B, in the embodiment of FIG. 5C the processor is located in or on the vibration sensor 520C, and in the embodiment of FIG. 5D the processor is located in or on the damper 525D.

Figure 6:
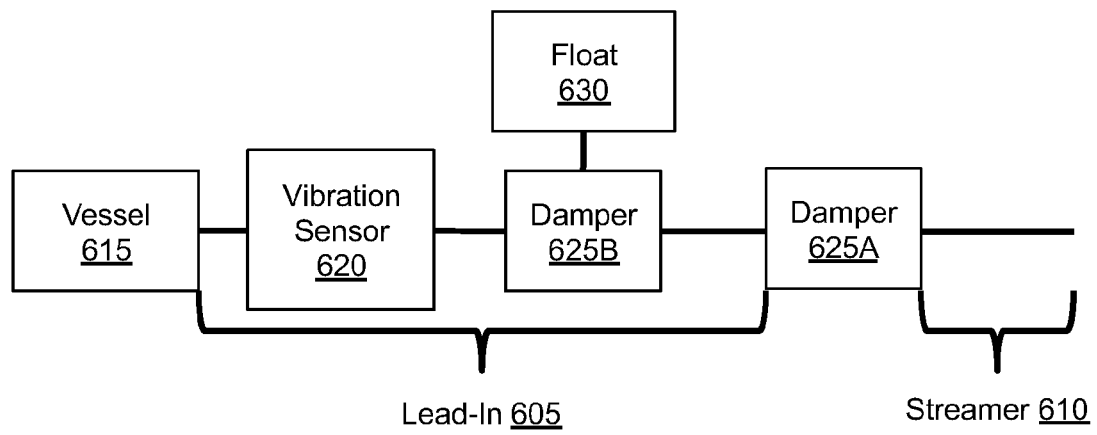
FIG. 6 is a schematic diagram of a system for attenuating axial and transverse vibrations.

FIG. 6 is a schematic diagram of a system for attenuating axial and transverse vibrations. The system includes a lead-in 605 connected to vessel 615 and coupled to a vibration sensor 620, damper 625A, damper 625B, and float 630.

Damper 625A is part of the lead-in 605 and attenuates axial vibrations in a manner similar to that described above in connection with FIGS. 4A-4C. Damper 625B is coupled between the lead-in 605 and seismic streamer 610 and attenuates transverse vibrations in a manner similar to that described above in connection with FIGS. 5A-5D.

Figure 1:
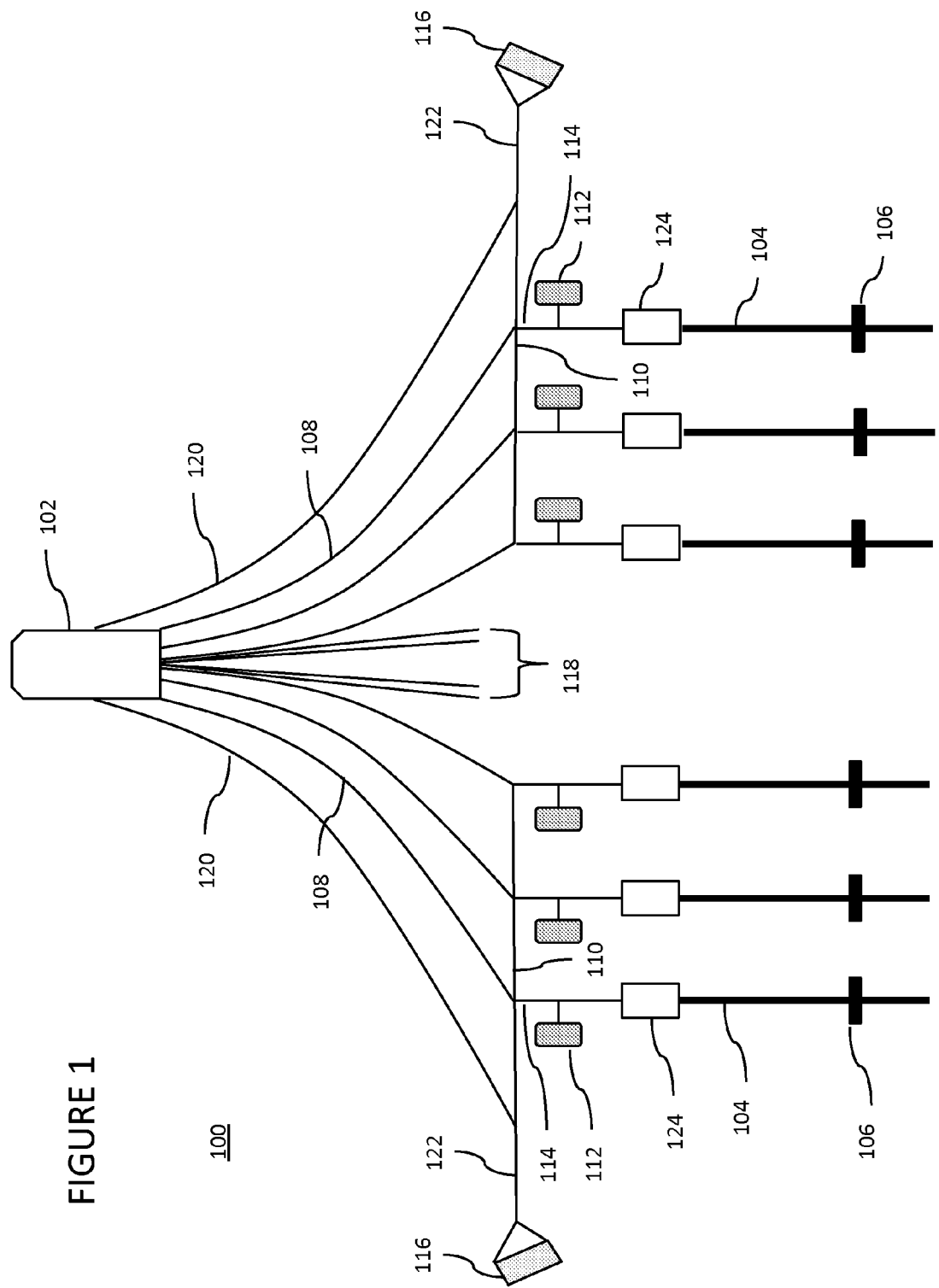
FIG. 1 is a schematic diagram of a traditional seismic survey.
Figure 2:
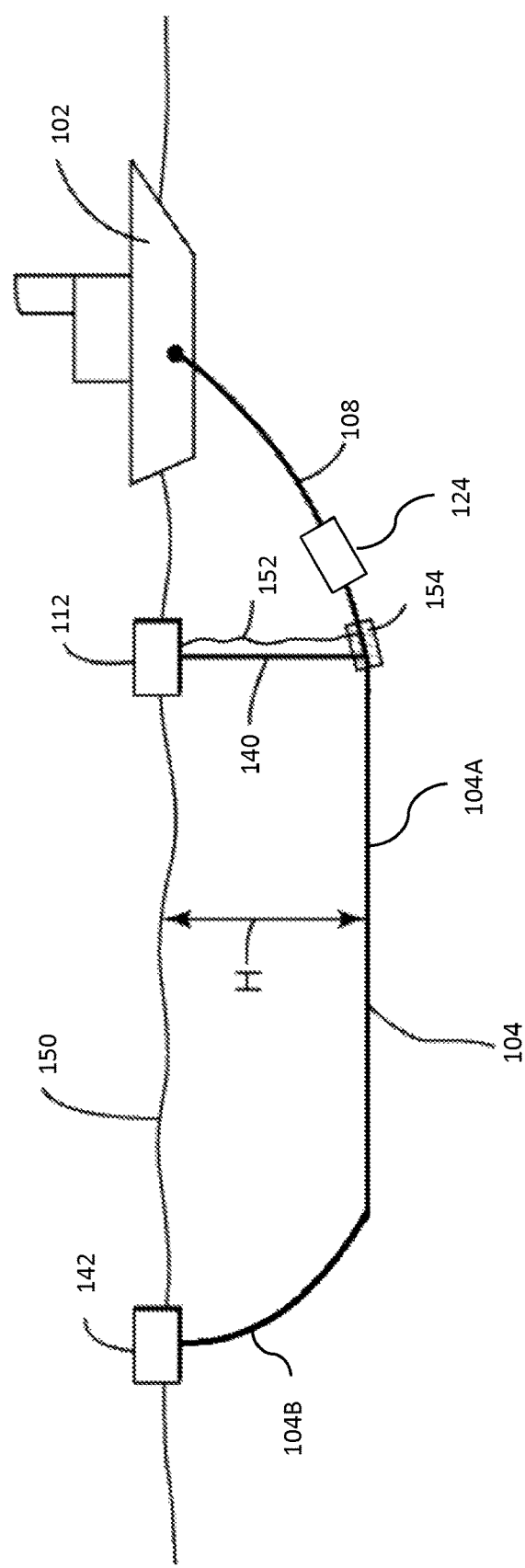
FIG. 2 is a side view of a streamer when deployed under water.

For ease of illustration FIG. 6 does not illustrate the processor that receives the signals from the vibration sensor 620 and sends the control signals to dampers 625A and 625B. It should be recognized, however, that the processor can be located in any of the positions described above in connection with FIGS. 4A-4C and 5A-5D. Although FIG. 6 illustrates a single vibration sensor 620, the system can be implemented with more than one vibration sensor, such as one for detecting axial vibrations and one for detecting transverse vibrations. For ease of illustration FIGS. 4A-4C, 5A-5D, and 6 are illustrated using a single streamer connected to the front-end. It will be recognized, however, that multiple streamers can be connected to the front-end as described above in connection with FIG. 1.

Further, although the figures illustrate a single lead-in, damper, and vibration sensor, there can be more than one, such as multiple lead-ins, each including a damper and vibration sensor. Alternatively, multiple lead-ins can each include a damper but employ one or more common vibration sensors. In any of these implementations there can be a common processor shared among the different dampers and vibration sensors or a processor can be employed for each set of a damper and vibration sensor.

Figure 7A:
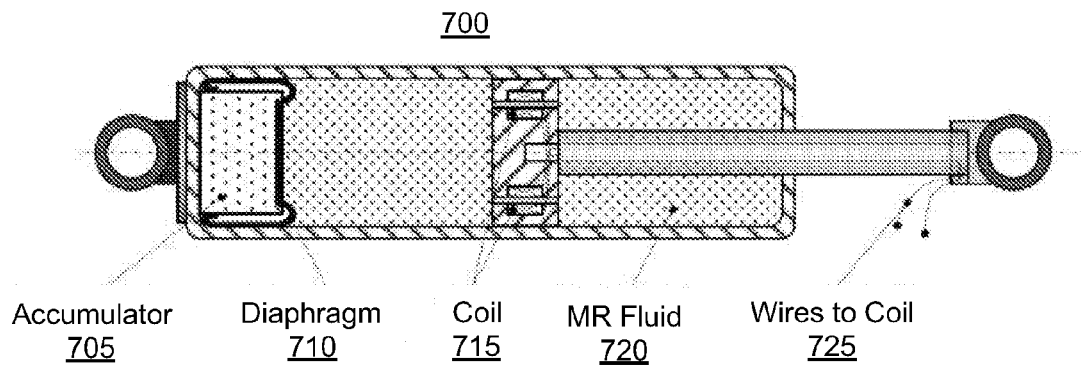
FIGS. 7A and 7B are schematic diagrams of active dampers.
Figure 7B:
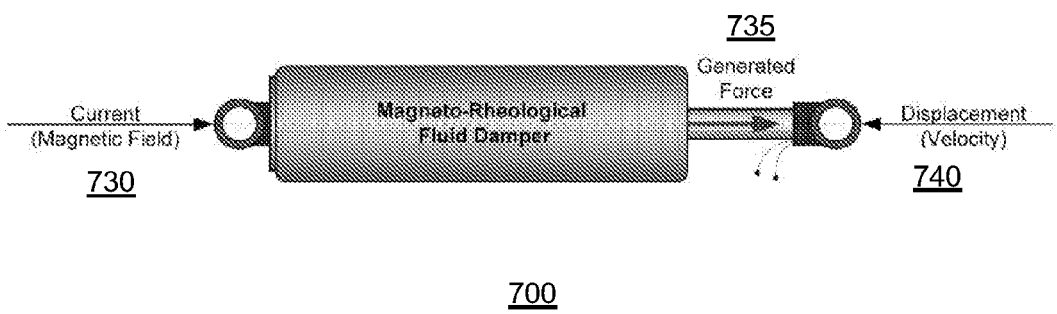

In an embodiment the active damper described above can be a magneto-rheological fluid damper, such as the one illustrated in FIGS. 7A and 7B. These types of dampers contain a magneto-rheological (MR) fluid 720 whose viscosity is based on a magnetic field generated by coil 715. The magnetic field is generated using current applied to wires 725, which are connected to the coil. In operation the MR fluid 720 flows through orifices located in the vicinity of coils 715, the flow rate of which depends on the viscosity of the MR fluid 720. Different flow rates dampen different frequencies, and accordingly the current supplied to the damper depends upon the frequencies of the vibrations that are to be canceled. In order to accommodate volume changes during operation the accumulator 705, which is separated from the MR fluid 720 by diaphragm 710, contains a compressed inert gas, such as nitrogen. Although the damper 700 is an active damper when current is supplied to the coil 715, and thus can dampen over a broad range of frequencies, the damper 700 can also operate as a passive damper when no current is supplied, such as if there is a failure in the delivery of the current. Thus, damper 700 can still attenuate some vibrations even in case of failure of the current supply.

FIG. 7B is a schematic diagram of the operation of magneto-rheological fluid damper 700. Based on a current 730 supplied to the damper 700 the viscosity of the MR fluid 720 changes, which in turn changes the force 735 generated by the damper against the displacement 740 of the piston due to vibrations. An active damper, such as the magneto-rheological fluid damper 700, can significantly reduce vibrations much quicker than without a damper. For example, in some situations an undamped arrangement could have significant amplitude due to vibrations even after 600 seconds, whereas an active damper can almost completely remove vibrations after 60 seconds.

In another embodiment the active damper can be an electromagnetic actuator or transducer. The actuator or transducer relaxes and contracts according to the control signal to attenuate the vibrations. For example, an incoming vibration at 4 Hz with 3 mm amplitude can be canceled by creating a 3 mm 4 Hz movement of the actuator or transducer with minima coinciding with the maxima of the incoming vibration.

Figure 8:
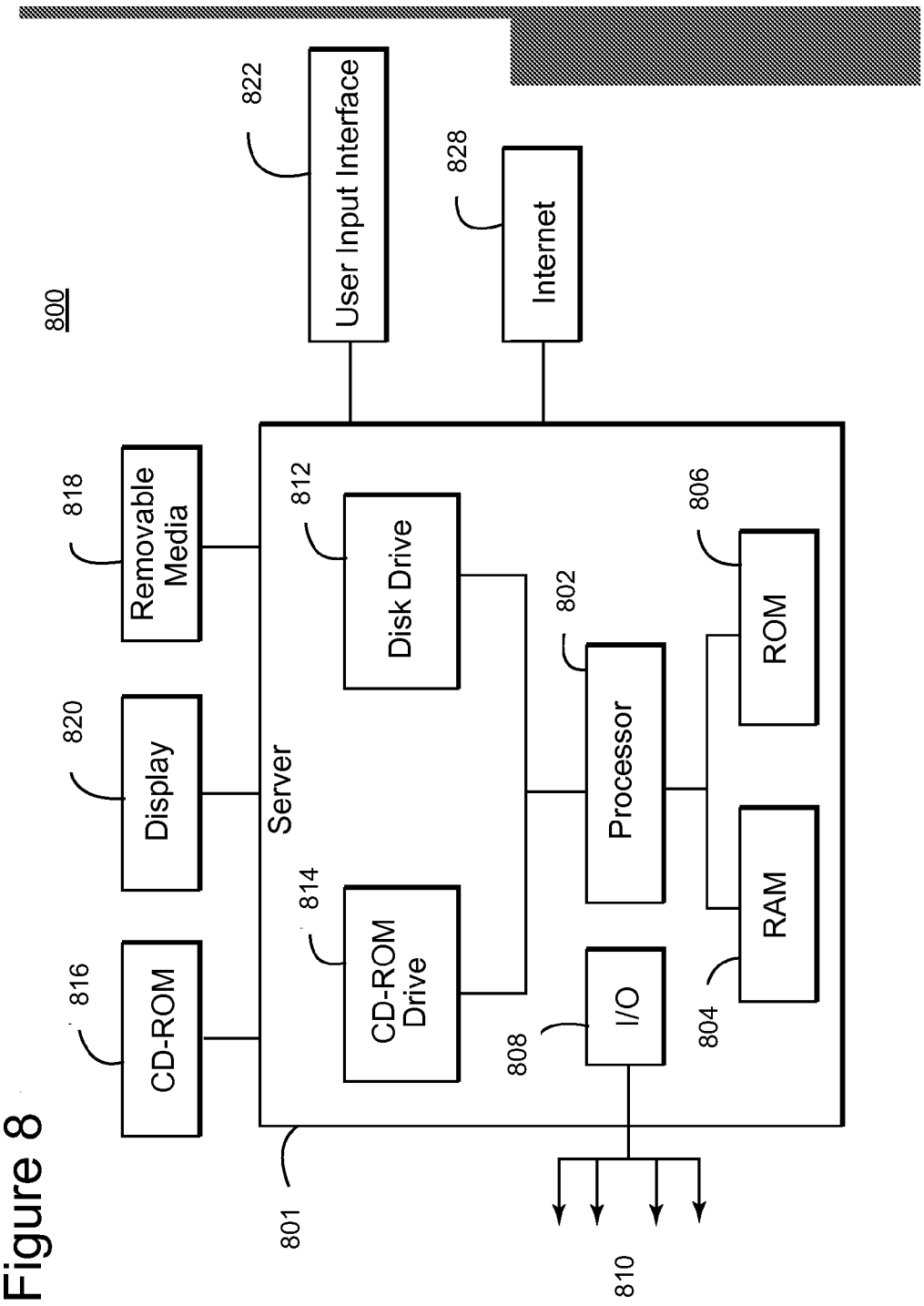
FIG. 8 is a schematic diagram of a control system.

An example of a representative control system capable of carrying out operations in accordance with the exemplary embodiments discussed above is illustrated in FIG. 8. Hardware, firmware, software or a combination thereof may be used to perform the various steps and operations described herein.

The exemplary control system 800 suitable for performing the activities described in the above-noted embodiments may include server 801. Such a server 801 may include a central processor unit (CPU) 802 coupled to a random access memory (RAM) 804 and to a read-only memory (ROM) 806. ROM 806 may also be other types of storage media to store programs, such as programmable ROM (PROM), erasable PROM (EPROM), etc. Processor 802 may communicate with other internal and external components through input/output (I/O) circuitry 808 and bussing 810, to provide control signals and the like. For example, processor 802 may communicate with the sensors, electromagnetic actuator system and/or the pressure mechanism of the source element. Processor 802 carries out a variety of functions as are known in the art, as dictated by software and/or firmware instructions.

Server 801 may also include one or more data storage devices, including hard and disk drives 812, CD-ROM drives 814, and other hardware capable of reading and/or storing information, such as a DVD, etc. In one embodiment, software for carrying out the above-discussed steps may be stored and distributed on a CD-ROM 816, removable media 818 or other form of media capable of portably storing information. These storage media may be inserted into, and read by, devices such as the CD-ROM drive 814, the disk drive 812, etc. Server 801 may be coupled to a display 820, which may be any type of known display or presentation screen, such as LCD, plasma displays, cathode ray tubes (CRT), etc. A user input interface 822 is provided, including one or more user interface mechanisms such as a mouse, keyboard, microphone, touch pad, touch screen, voice-recognition system, etc.

Server 801 may be coupled to other computing devices, such as the equipment of a vessel, via a network. The server may be part of a larger network configuration as in a global area network (GAN) such as the Internet 828, which allows ultimate connection to the various landline and/or mobile client/watcher devices.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a non-transitory computer-readable storage medium having computer-readable instructions embodied in the medium. Any suitable computer-readable medium may be utilized, including hard disks, CD-ROMs, digital versatile discs (DVD), optical storage devices or magnetic storage devices such a floppy disk or magnetic tape. Other non-limiting examples of computer-readable media include flash-type memories or other known types of memories.

The disclosed exemplary embodiments provide systems and methods for attenuating axial and/or transverse vibrations generated by a front-end coupling the streamers to the towing vessel. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for reducing vibrations on a front-end of seismic survey equipment, the method comprising:
   towing, by a vessel, a seismic streamer comprising a plurality of seismic receivers, wherein the seismic streamer is connected to the vessel by the front-end and a damper is coupled to the front-end;
   detecting a vibration on the front-end;
   determining a damper response to the detected vibration on the front-end; and
   actively adjusting the damper based on the damper response,
   wherein the damper comprises a first and second damper, the front-end includes a lead-in coupling the seismic streamer to the vessel, the first damper is coupled between the seismic streamer and the lead-in and dampens vibrations in an axial direction along the lead-in, the lead-in is coupled to a float via the second damper that dampens vibrations in a direction transverse to an axial direction of the lead-in.

2. The method of claim 1, wherein the front-end includes a lead-in coupling the seismic streamer to the vessel, the damper is coupled between the seismic streamer and the lead-in, and the damper dampens vibrations in an axial direction along the lead-in.

3. The method of claim 1, wherein the front-end includes a lead-in coupling the seismic streamer to the vessel, the damper is coupled between the lead-in and the seismic streamer, the lead-in is coupled to a float via the damper, and the damper dampens vibrations in a direction transverse to an axial direction of the lead-in.

4. The method of claim 1, wherein the damper is a magneto-rheological damper and the active adjustment involves applying a current to the damper.

5. The method of claim 1, wherein the damper is an electromagnetic actuator or transducer and the active adjustment involves applying a current to the electromagnetic actuator or transducer.

6. The method of claim 1, wherein the detected vibration has a frequency and amplitude, and the actively adjusting of the damper involves lengthening and/or contracting the damper with the amplitude and with the frequency, in an opposite phase of the detected vibration.

7. The method of claim 1, wherein the seismic streamer is towed for a duration of a seismic survey and the vibration detection, damper response determination, and active adjustment are performed continuously during the duration of the seismic survey.

8. A system, comprising:
   a seismic streamer comprising a plurality of seismic receivers;
   a front-end connected to the streamer on a first side and having a vessel coupling on a second side;
   a vibration sensor coupled to the front-end;
   a processor coupled to the vibration sensor; and
   an active damper coupled to the front-end and the processor and arranged to dampen vibrations of the front-end,
   wherein the processor controls the active damper to dampen the vibrations of the front-end using information from the vibration sensor, and
   wherein the front-end includes a lead-in having the vessel coupling, the active damper comprises a first and second damper, the first damper is coupled between the seismic streamer and the lead-in and the damper dampens vibrations in an axial direction along the lead-in, the second damper is coupled between the lead-in and a float, and the second damper dampens vibrations in a direction transverse to an axial direction of the lead-in.

9. The system of claim 8, wherein the front-end includes a lead-in having the vessel coupling, the damper is coupled between the seismic streamer and the lead-in, and the damper dampens vibrations in an axial direction along the lead-in.

10. The system of claim 8, further comprising:
    a float coupled to the damper, wherein the front-end includes a lead-in having the vessel coupling, the damper is coupled between the lead-in and the seismic streamer, the lead-in is coupled to a float via the damper, and the damper dampens vibrations in a direction transverse to an axial direction of the lead-in.

11. The system of claim 8, wherein the vibration sensor is arranged on the front-end between the active damper and the vessel coupling.

12. The system of claim 8, wherein the damper is a magneto-rheological damper.

13. The system of claim 8, wherein the damper is an electromagnetic actuator or transducer.

14. A non-transitory computer-readable medium containing computer-executable code that when read by a computer causes the computer to perform a method for reducing vibrations on a front-end of seismic survey equipment, the method comprising:
    detecting a vibration on the front-end while a vessel tows a seismic streamer comprising a plurality of seismic receivers, wherein the seismic streamer is connected to the vessel by the front-end and a damper is coupled to the front-end;
    determining a damper response to the detected vibration on the front-end; and
    actively adjusting the damper based on the damper response,
    wherein the damper comprises a first and second damper, the front-end includes a lead-in coupling the seismic streamer to the vessel, the first damper is coupled between the seismic streamer and the lead-in and dampens vibrations in an axial direction along the lead-in, the lead-in is coupled to a float via the second damper that dampens vibrations in a direction transverse to an axial direction of the lead-in.

15. The non-transitory computer-readable medium of claim 14, wherein the front-end includes a lead-in coupling the seismic streamer to the vessel, the damper is coupled between the seismic streamer and the lead-in, and the damper dampens vibrations in an axial direction along the lead-in.

16. The non-transitory computer-readable medium of claim 14, wherein the front-end includes a lead-in coupling the seismic streamer to the vessel, the damper is coupled between the lead-in and the seismic streamer, the lead-in is coupled to a float via the damper, and the damper dampens vibrations in a direction transverse to an axial direction of the lead-in.

17. The non-transitory computer-readable medium of claim 14, wherein the detected vibration has a frequency and amplitude, and the actively adjusting of the damper involves lengthening and/or contracting the damper with the amplitude and with the frequency, in an opposite phase of the detected vibration.

\* \* \* \* \*